United States Patent
Zhang et al.

(10) Patent No.: US 12,538,236 B2
(45) Date of Patent: Jan. 27, 2026

(54) SYSTEM AND METHOD FOR POWER CONTROL IN UPLINK TRANSMISSIONS

(71) Applicant: ZTE CORPORATION, Guangdong (CN)

(72) Inventors: Yang Zhang, Shenzhen (CN); Chuangxin Jiang, Shenzhen (CN); Ke Yao, Shenzhen (CN); Shujuan Zhang, Shenzhen (CN); Zhaohua Lu, Shenzhen (CN); Hao Wu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 299 days.

(21) Appl. No.: 18/340,666

(22) Filed: Jun. 23, 2023

(65) Prior Publication Data

US 2023/0337144 A1 Oct. 19, 2023

Related U.S. Application Data (63) Continuation of application No. PCT/CN2020/139113, filed on Dec. 24, 2020.

(51) Int. Cl.
*H04W 52/14* (2009.01)
*H04W 52/08* (2009.01)
*H04W 52/24* (2009.01)

(52) U.S. Cl.
CPC .......... *H04W 52/146* (2013.01); *H04W 52/08* (2013.01); *H04W 52/242* (2013.01)

(58) Field of Classification Search
CPC . H04W 52/146; H04W 52/08; H04W 52/242; H04W 52/386; H04W 52/32
See application file for complete search history.

(56) References Cited

U.S. PATENT DOCUMENTS

| | | | |
|---|---|---|---|
| 2018/0242308 A1* | 8/2018 | Ko | ........................ H04L 5/0092 |
| 2019/0191328 A1 | 6/2019 | Dinan | |
| 2020/0267663 A1 | 8/2020 | Xu et al. | |
| 2023/0063015 A1* | 3/2023 | Muruganathan | ...... H04W 72/23 |

FOREIGN PATENT DOCUMENTS

| | | |
|---|---|---|
| CN | 110049539 A | 7/2019 |
| CN | 110710281 A | 1/2020 |
| JP | 2023-553981 A | 12/2023 |

(Continued)

OTHER PUBLICATIONS

VIVO: "Further discussion on enhancement of MTRP operation", 3GPP Draft; R1-2007645, 3rd Generation [Artnership Project (3GPP), vol. RAN WG1, no. e-Meeting; Oct. 26, 2020-Nov. 13, 2020 Oct. 24, 2020 (Oct. 24, 2020), XP051946454. (Year: 2020).*

(Continued)

*Primary Examiner* — John J Lee
(74) *Attorney, Agent, or Firm* — Foley & Lardner LLP (57) ABSTRACT

A system and method for wireless communication are disclosed herein. One embodiment includes a wireless communication device receiving, from a wireless communication node, a configuration that comprises a plurality of sets of power control parameters; and receiving, from the wireless communication node, a signalling to associate the plurality of sets of power control parameters with a plurality of sets of uplink data transmission instances.

16 Claims, 6 Drawing Sheets

(56) References Cited

FOREIGN PATENT DOCUMENTS

WO     WO-2019/096317 A1     5/2019
WO     WO-2019/215709 A1     11/2019
WO     WO-2022/132635 A1     6/2022

OTHER PUBLICATIONS

Ad-Hoc Chair (Samsung), "Session notes for 8.1 (Further enhancements on MIMO for NR)", 3GPP TSG RAN WG1 Meeting #103-e, R1-2009832, Nov. 13, 2020, e-Meeting (17 pages).
CATT: "Discussion on enhancements on multi-TRP/panel for PDCCH, PUCCH and PUSCH" 3GPP TSG RAN WG1 Meeting #103-e; R1-2007825; Nov. 13, 2020; e-Meeting (15 pages).
Ericsson, "On PDCCH, PUCCH and PUSCH enhancements with multiple TRPs", 3GPP TSG-RAN WG1 Meeting #103, R1-2009223, Nov. 13, 2020, eMeeting (25 pages).
Fraunhofer Iis et al., "On multi-TRP enhancements for PDCCH and PUSCH", 3GPP TSG RAN WG1 Meeting #103-e, R1-2008898, Nov. 13, 2020, e-Meeting (9 pages).
Lenovo et al., "Enhancements on Multi-TRP for PDCCH, PUCCH and PUSCH", 3GPP TSG RAN WG1 #103-e, R1-2008911, Nov. 13, 2020, e-Meeting (15 pages).
LG Electronics, "Enhancements on Multi-TRP for PDCCH, PUCCH and PUSCH", 3GPP TSG RAN WG1 #103-e, R1-2008574, Nov. 13, 2020, e-Meeting (7 pages).
Moderator (Nokia, Nokia Shanghai Bell), "Summary of Multi-TRP URLLC for PUCCH and PUSCH", 3GPP TSG RAN WG1 #103, R1-2009757, Nov. 13, 2020, e-Meeting (23 pages).
OPPO, "Enhancements on multi-TRP for PDCCH, PUCCH and PUSCH", 3GPP TSG RAN WG1 #103- e, R1-2008218, Nov. 13, 2020, e-Meeting (9 pages).
Qualcomm Incorporated, "Enhancements on Multi-TRP for PDCCH, PUCCH and PUSCH", 3GPP TSG-RAN WG1 Meeting #103-e, R1-2009251, Nov. 13, 2020, e-Meeting (33 pages).
VIVO, "Further discussion on enhancement of MTRP operation", 3GPP TSG RAN WG1 #103-e, R1-2007645, Nov. 13, 2020, e-Meeting (15 pages).
Xiaomi, "Enhancements on Multi-TRP for PDCCH, PUCCH and PUSCH", 3GPP TSG RAN WG1 #103-e, R1-2009028, Nov. 13, 2020, e-Meeting (18 pages).
ZTE, "Multi-TRP enhancements for PDCCH, PUCCH and PUSCH", 3GPP TSG RAN WG1 Meeting #103-e, R1-2007764, Nov. 13, 2020, e-Meeting (22 pages).
International Search Report and Written Opinion for PCT Appl. No. PCT/CN2020/139113, mailed Sep. 15, 2021 (8 pages).
Extended European Search Report for EP App. No. 20966501.7 dated Jan. 26, 2024 (15 pages).
Nokia, et al., "Enhancements for Multi-TRP URLLC schemes," 3GPP TSG RAN WG1 #103 Meeting, R1-2008904, e-Meeting, Oct. 26-Nov. 13, 2020 (18 pages).
OPPO, "Discussion on Multi-beam Operation Enhancements," 3GPP TSG RAN WG1 #98bis, R1- 1910117, Oct. 14-20, 2019; Chongqing, China (11 pages).
Samsung, "Offline Discussion 101: EMIMO MAC Corrections—Phase 2," 3GPP TSG-RAN2 Meeting #109bis Electronic, R2-2003900, Apr. 20-24, 2020 (18 pages).
Notice of Reasons for Rejection for JP Appl. No. 2023-538967, dated Jun. 25, 2024 (with English translation, 10 pages).
OPPO, "Text proposals for enhancements on Multi-TRP and panel Transmission", 3GPP TSG RAN WG1 #100bis, R1-2001726, Apr. 30, 2023, e-Meeting (13 pages).
ZTE, "Enhancements on Multi-TRP for PDCCH, PUCCH and PUSCH", 3GPP TSG RAN WG1 Meeting #104-e, R1-2100286, Jan. 25, 2021, e-Meeting (25 pages).
Office Action for CN App. No. 202311180749.4 dated Nov. 3, 2025 (received Nov. 16, 2025) (with English translation, 16 pages).

* cited by examiner

Receiving a configuration of power control parameters
301

Receiving signalling that associates the power control parameters with uplink data transmission instances
302

SYSTEM AND METHOD FOR POWER CONTROL IN UPLINK TRANSMISSIONS

CROSS-REFERENCE TO RELATED APPLICATION

This application claims the benefit of priority under 35 U.S.C. § 120 as a continuation of PCT Patent Application No. PCT/CN2020/139113, filed on Dec. 24, 2020, the disclosure of which is incorporated herein by reference in its entirety.

TECHNICAL FIELD

The disclosure relates generally to wireless communications and, more particularly, to systems and methods for Physical Uplink Shared Channel (PUSCH) transmission power control.

BACKGROUND

Joint transmission or reception is the transmission or reception of multiple signals from multiple sites transmitted or received at the same time. Joint transmission or reception of Multiple Transmission and Reception Point (Multi-TRP) plays a significant role in increasing the throughput of wireless communication. Both Long Term Evolution-Advanced (LTE-A) and New Radio Access Technology (NR) support multi-transmission receiving node transmission.

SUMMARY

The example implementations disclosed herein are directed to solving the issues relating to one or more of the problems presented in the prior art, as well as providing additional features that will become readily apparent by reference to the following detailed description when taken in conjunction with the accompany drawings. In accordance with various implementations, example systems, methods, devices and computer program products are disclosed herein. It is understood, however, that these implementations are presented by way of example and are not limiting, and it will be apparent to those of ordinary skill in the art who read the present disclosure that various modifications to the disclosed implementations can be made while remaining within the scope of this disclosure.

In one implementation, a method performed by a wireless communication device includes receiving, from a wireless communication node, a configuration that comprises a plurality of sets of power control parameters; and receiving, from the wireless communication node, a signalling to associate the plurality of sets of power control parameters with a plurality of sets of uplink data transmission instances.

In another implementation, a method performed by a wireless communication device includes each of the sets of power control parameters comprising at least one of: a target received power, a ratio of fractional path-loss compensation, a physical uplink shared channel (PUSCH) path loss estimation reference signal index, or a closed loop power control adjustment index.

In one implementation, a method performed by a wireless communication node includes transmitting to a wireless communication device, a configuration that comprises a plurality of sets of power control parameters; and transmitting, to the wireless communication device, a signalling to associate the plurality of sets of power control parameters with a plurality of sets of uplink data transmission instances.

In another implementation, a method performed by a wireless communication node includes each of the sets of power control parameters comprising at least one of: a target received power, a ratio of fractional path-loss compensation, a physical uplink shared channel (PUSCH) path loss estimation reference signal index, or a closed loop power control adjustment index.

The above and other aspects and their implementations are described in greater detail in the drawings, the descriptions, and the claims.

BRIEF DESCRIPTION OF THE DRAWINGS

Various example implementations of the present solution are described in detail below with reference to the following figures or drawings. The drawings are provided for purposes of illustration only and merely depict example implementations of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION OF EXAMPLE IMPLEMENTATIONS

Various example implementations of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example implementations and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
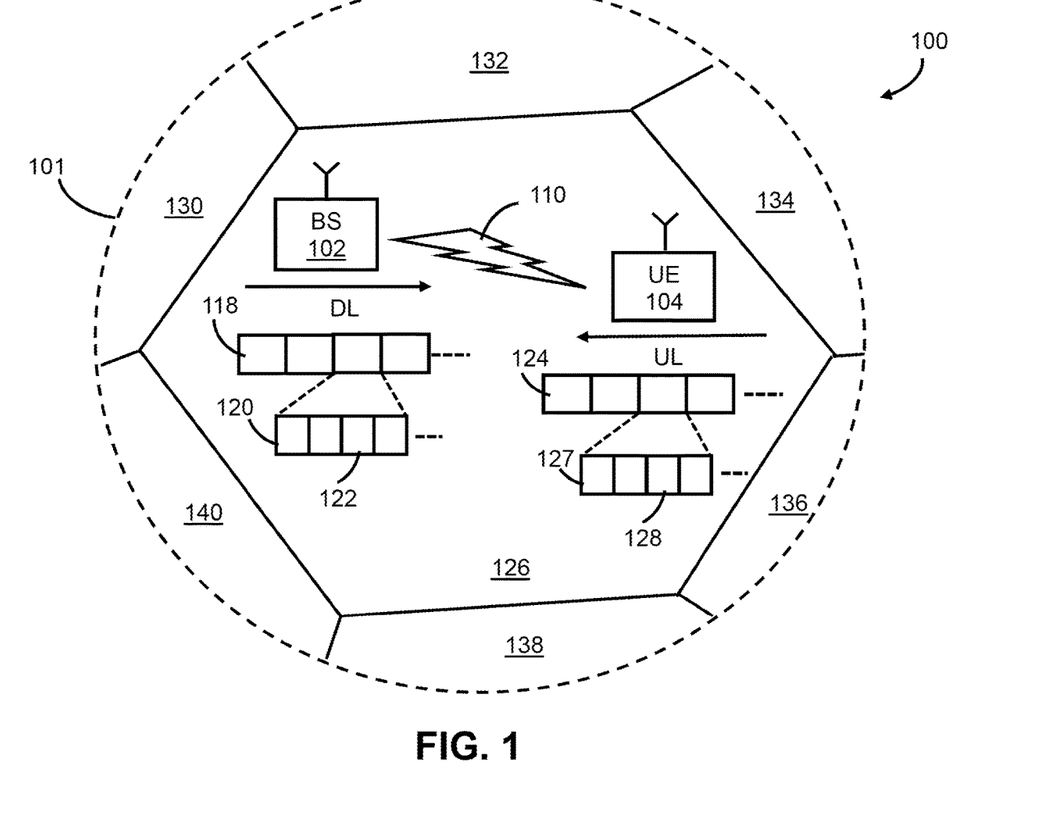
FIG. 1 illustrates an example cellular communication network in which techniques and other aspects disclosed herein may be implemented, in accordance with an implementation of the present disclosure.

FIG. 1 illustrates an example wireless communication network, and/or system, 100 in which techniques disclosed herein may be implemented, in accordance with an implementation of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102") and a user equipment device 104 (hereinafter "UE 104") that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various implementations of the present solution.

Figure 2:
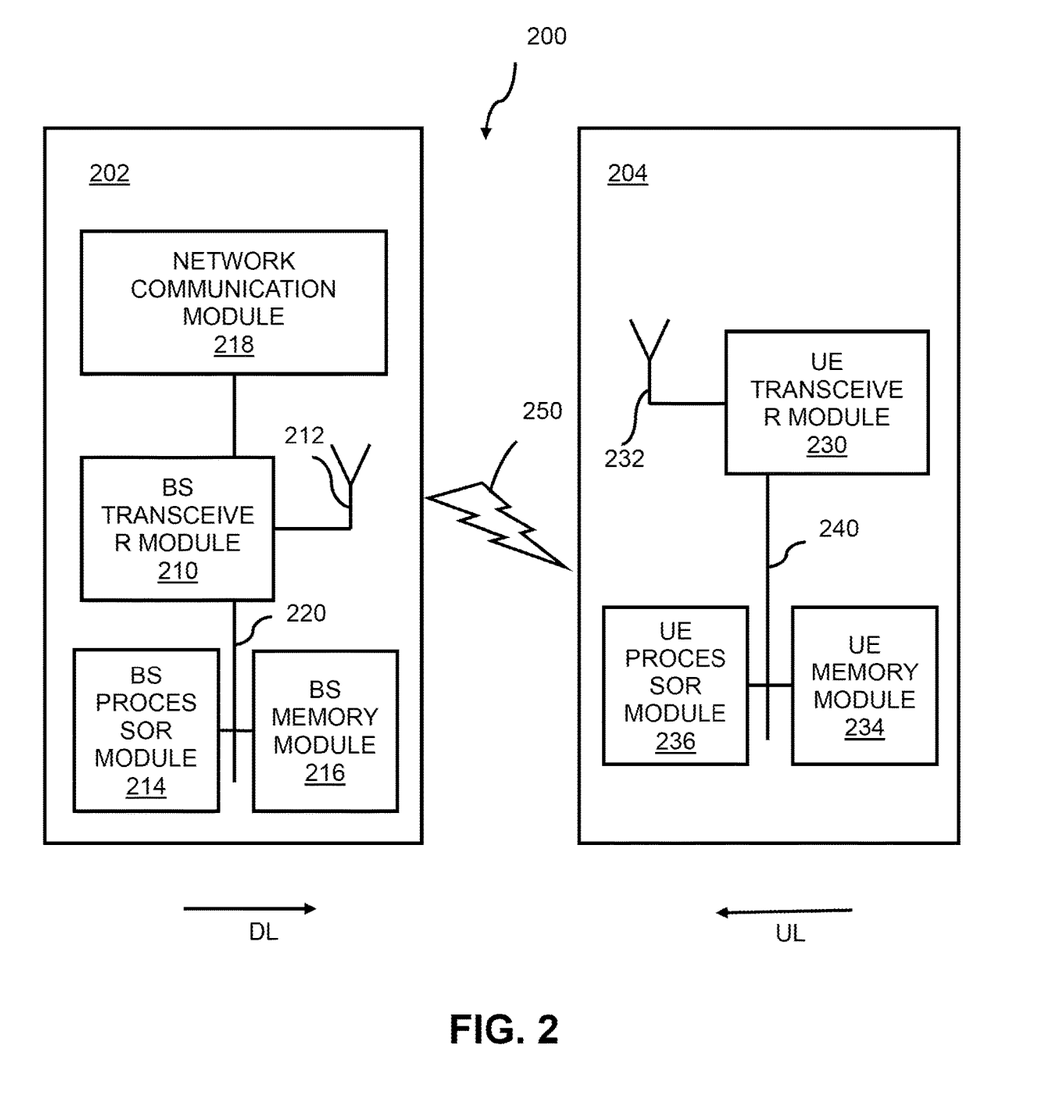
FIG. 2 illustrates block diagrams of an example base station and a user equipment device, in accordance with some implementations of the present disclosure.

FIG. 2 illustrates a block diagram of an example wireless communication system 200 for transmitting and receiving wireless communication signals, e.g., OFDM/OFDMA signals, in accordance with some implementations of the present solution. The system 200 may include components and elements configured to support known or conventional operating features that need not be described in detail herein. In one illustrative implementation, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the implementations disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure.

In accordance with some implementations, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some implementations, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 can be coordinated in time such that the uplink receiver circuitry is coupled to the uplink antenna 232 for reception of transmissions over the wireless transmission link 250 at the same time that the downlink transmitter is coupled to the downlink antenna 212. In some implementations, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative implementations, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various implementations, the BS 202 may be an evolved node B (eNB), a serving eNB, a target eNB, a femto station, or a pico station, for example. In some implementations, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the implementations disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some implementations, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

New Radio technology (NR) is a new radio access technology developed by $3^{rd}$ Generation Partnership Project (3GPP) as a standard for air interfaces in radio networks. Available frequencies for use in NR systems include a first frequency range (FR1) and a second frequency range (FR2). Frequencies in FR1 include sub-6 GHZ frequencies and frequencies in FR2 include frequencies in the millimeter wavelength range (e.g., over 6 GHz).

5G NR includes multiple input multiple output (MIMO) features that facilitate utilizing a large number of antenna elements at a base station (BS). One MIMO feature is support for multi-TRP operation. In 5G NR, PUSCH repetition is supported based on single-TRP. Single-TRP reduces the reliability of a communications system. For example, in FR2, when a link between a UE and a TRP is affected by blockage, the reliability of the PUSCH repetition based on single-TRP reduces. A BS may use multiple TRPs to transmit data to the UE to improve transmission performance. A UE may use the same information for the repeated transmission across multiple slots. That is, each of the transmissions use at least the same spatial relation, precoder and/or power control parameters because the of PUSCH transmissions/repetitions for single-TRP. The robustness and reliability for PUSCH transmission may be improved by single downlink control information (DCI) based multi-TRP PUSCH repetition.

Figure 3:
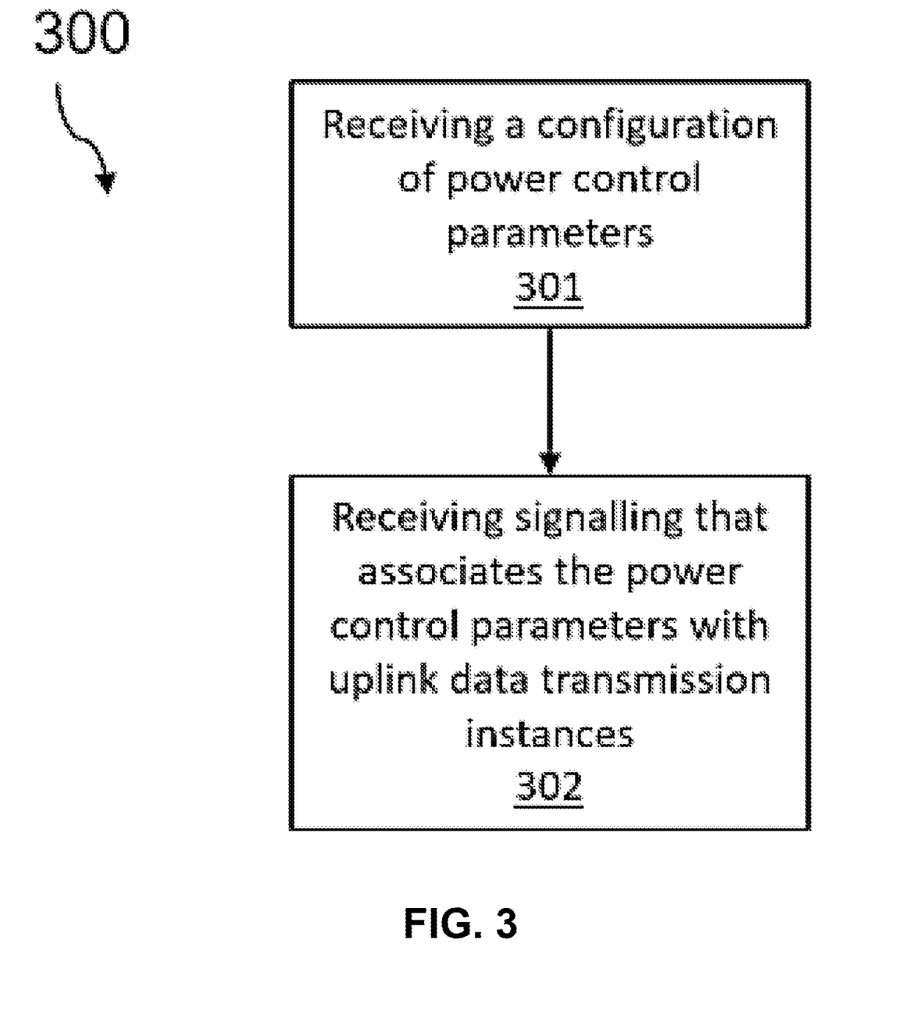
FIG. 3 illustrates an example method of a UE being configured for single DCI based multi-TRP PUSCH repetition, in accordance with some implementations of the present disclosure.

FIG. 3 illustrates an example method 300 of a UE being configured for single DCI based multi-TRP PUSCH repetition, in accordance with some implementations of the present disclosure.

As shown in 301, a UE may receive from a BS a configuration of sets of power control parameters. The power control parameters may include at least one of: a target received power, a ratio of fractional path-loss compensation, a physical uplink shared channel (PUSCH) path-loss estimation reference signal index, or a closed loop power control adjustment index. The configured sets of power control parameters may be received through a radio resource control (RRC) signalling.

As shown in 302, the UE may also receive from the BS signalling to associate the sets of the configured power control parameters with sets of uplink data transmission instances. For instance, there may be a first mapping list and a second mapping list, where the two mapping lists are used to associate two SRI indications with the power control parameters of two PUSCH transmission sets respectively. The UE may be scheduled to transmit multiple PUSCH transmissions, where each PUSCH transmission instance may be associated with an SRS resource set. The SRS resource sets may be configured with the same higher layer parameter usage in SRS-ResourceSet. The SRS-ResourceSet may be set to 'codebook' or 'nonCodebook'. That is, each of the uplink data transmission instances may be codebook based or non-codebook based PUSCH transmissions.

Additionally or alternatively, there may be a first configured mapping and a second configured mapping within a single configured mapping list. The two mappings in the single configured mapping list may be used to associate the SRI indication with the power control parameters for two PUSCH transmission sets respectively. The first mapping and the second mapping in the single configured mapping list may be the first element and the second element in the single configured mapping, respectively. Additionally or alternatively, the first mapping and the second mapping in the single configured mapping may be the first element of the first half and the second half of the configured mapping list, respectively.

Figure 4:
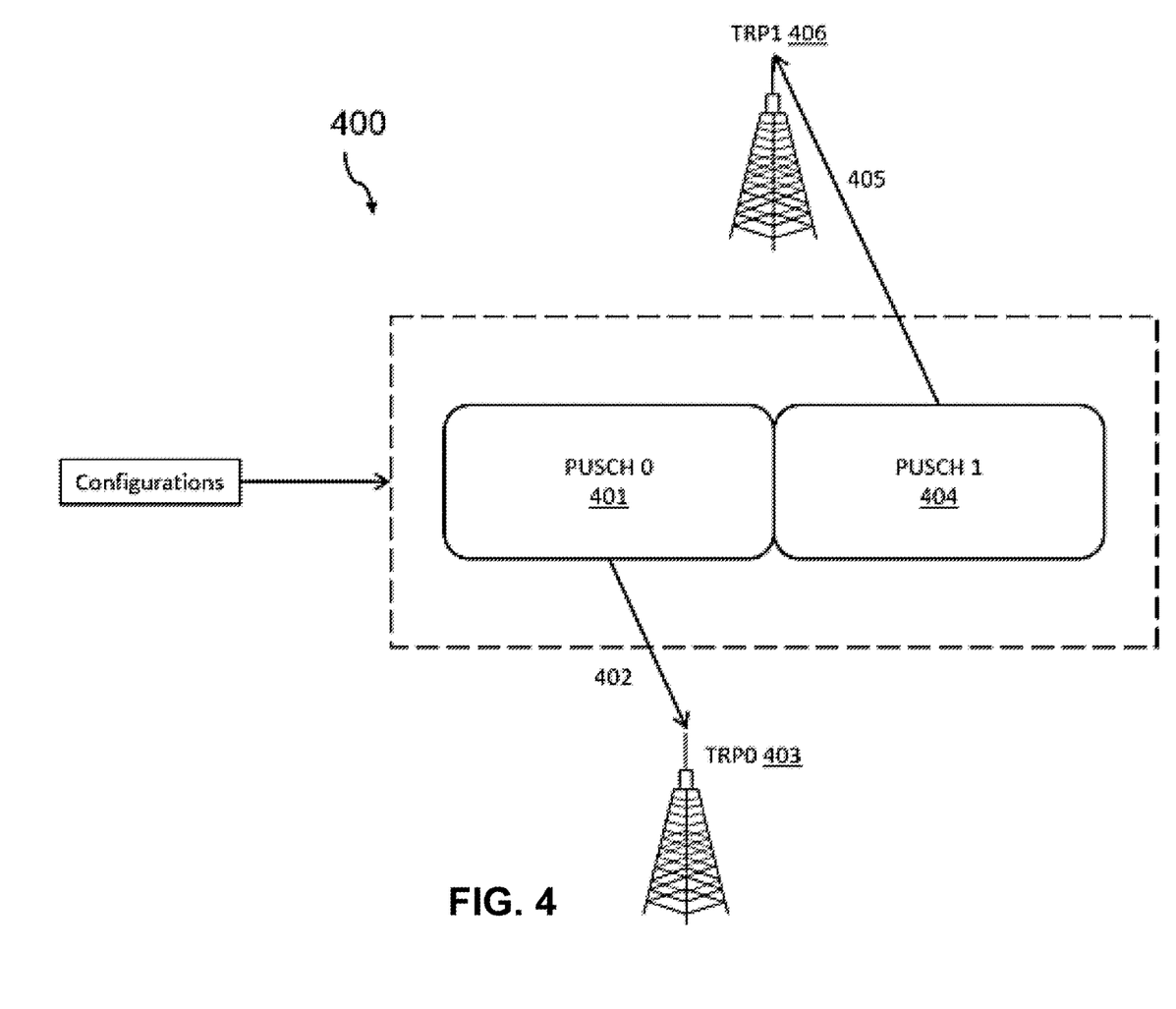
FIG. 4 illustrates a block diagram of single DCI based multi-TRP PUSCH operation, in accordance with some implementations of the present disclosure.

FIG. 4 illustrates a block diagram 400 of single DCI based multi-TRP PUSCH operation, in accordance with some implementations of the present disclosure. As shown, a first PUSCH 401 (PUSCH0) is transmitted 402 to a first TRP 403 (TRP0), and a second PUSCH 404 (PUSCH1) is transmitted 405 to a second TRP 406 (TRP1). The first PUSCH 402 transmission may use a first sounding resource set (SRS) (e.g., SRS set 0), and the second PUSCH 405 transmission may use a second SRS set (e.g., SRS set 1).

Due to different channel conditions of links between the UE and multiple TRPs (e.g., TRP0 403 and TRP1 406), the power of different PUSCH transmission may be independent for each TRP. As discussed herein, RRC signalling may be configured for each TRP such that the power control parameters for each TRP may be independent.

PUSCH transmission sets (e.g., PUSCH 401 and PUSCH 404) may be distinguished in various ways including: (1) the first PUSCH transmission set may be associated with a first SRS resource set using non-codebook based transmission, while the second PUSCH transmission set may be associated with another SRS resource set using non-codebook based transmission (2) the first PUSCH transmission set may correspond to a first transmission occasion, while the second PUSCH transmission may correspond to a second transmission occasion (3) the first PUSCH transmission set may correspond to a first frequency hop, and the second PUSCH transmission set may correspond to a second frequency hop (4) the first PUSCH transmission set may include a first half of a set of PUSCH transmissions, while the second PUSCH transmission set may include a second half of the set of PUSCH transmissions (5) the first PUSCH transmission set may include PUSCH transmissions in a set of PUSCH transmissions with an odd order, while the second PUSCH transmission set may include PUSCH transmissions in the set of PUSCH transmissions with an even order (6) the first PUSCH transmission set may include a number of PUSCH transmissions (e.g., a first, second, fifth and sixth PUSCH transmission), while the second PUSCH transmission set may include other PUSCH transmissions (e.g., a third, fourth, seventh and eighth PUSCH transmission).

The single DCI based multi-TRP PUSCH transmission may be configured such that several (e.g. two) SRS resource sets are configured with the same higher layer parameter usage in SRS-ResourceSet set to 'codebook' or 'nonCodebook'. Several (e.g. two) SRI indications in a DCI field may be used for SRS resource indication of the various SRS resource sets. In one configuration, the transmission rank and the number of SRS port(s) may be the same for each codebook based or non-codebook based PUSCH transmission.

A UE may transmit uplink data according to a codebook based or non-codebook based PUSCH transmissions. The power control mechanism for codebook based and non-codebook based PUSCH transmission may include a BS configuring UE specific power control parameters for the PUSCH transmission. That is, the BS may configure the higher layer parameter PUSCH-PowerControl. The power control parameter may include at least one of: (1) an open-loop power control parameter set (e.g., the higher layer parameter p0-AlphaSets) (2) a PUSCH path loss estimation reference signal (RS) index set (e.g., the higher layer parameter pathlossReferenceRSToAddModList) and (3) a mapping list (e.g., the higher layer parameter SRI-PUSCH-MappingToAddModList).

The open-loop power control parameter set may include at least one of an open-loop power control parameter (e.g., the higher layer parameter p0-PUSCH-AlphaSet). The open-loop power control parameter may include at least a target received power (denoted as p0) or a ratio of fractional path loss compensation (denoted as alpha).

The PUSCH path loss estimation RS index set may include at least one of a PUSCH path-loss estimation RS index (e.g., the higher layer parameter PUSCH-PathlossReferenceRS). The PUSCH path-loss estimation RS index (denoted as $q_d$) may include a RS resource index that corresponds to at least one of: (1) synchronization signal (SS)/physical broadcast channel (PBCH) block index or (2) non-zero power (NZP) channel status information (CSI) RS resource index.

The mapping list (e.g., the first mapping list, second mapping list, or configured mapping list containing a first mapping and a second mapping) may include at least a configured mapping (e.g., the higher layer parameter SRI-PUSCH-PowerControl). The configured mapping may include at least one of power control parameters such as: (1) an identity of the open-loop power control parameter (e.g., the higher layer parameter SRI-PO-PUSCH-AlphaSetId) (2) an identity of the PUSCH-path loss estimation RS index (e.g., the higher layer parameter SRI-PUSCH-PathlossReferenceRS-ID) or (3) a value of the close loop power control adjustment 1 (e.g., the higher layer parameter SRI-PUSCH-CloseLoopIndex). The mapping list may map an SRI indication with one or more power control parameters. In an example, a first mapping list may map a first SRI field with a set of power control parameters that correspond to a first set of uplink data transmission instances. Further, a second mapping list may map a second SRI field with the set of power control parameters that correspond to a second set of uplink data transmission instances.

In the event the UE is scheduled to transmit a PUSCH transmission, the power control parameters may be determined. The scheduling grant may include a downlink control information (DCI) format, a configured grant, and/or a dynamically configured grant. In a first PUSCH transmission set, the UE may determine the power control parameters for each PUSCH transmission based on a mapping from the first mapping list.

In one embodiment, when: (1) the UE is provided with various identities of the open-loop power control parameter by a configured mapping (e.g., there are various identities of the open-loop power control parameter configured by a single configured mapping list containing a first mapping configuration and a second mapping configuration, a configured mapping from a first mapping list and/or a configured mapping from a second mapping list) and (2) a scheduling grant scheduling the PUSCH transmission includes one or more SRS resource indicator (SRI) fields (e.g., the PUSCH transmission is scheduled according to a first SRI field and/or a second SRI field), then the UE may determine the value of the open-loop power control parameter based on the configured mapping and the SRI field value.

For instance, a first value of the open-loop power control parameter may be based on the configured mapping from a first mapping list and the SRI field value in the first SRI field associated with the configured mapping from the first mapping list. A second value of the open-loop parameter may be based on the configured mapping from a second mapping list and the SRI field value in the second SRI field associated with the configured mapping from the second mapping list. Additionally or alternatively, a first value of the open-loop power control parameter may be based on a first mapping and/or a second mapping contained within a single configured mapping list.

In the event the scheduling grant also includes an open-loop power control parameter set indication field and the value in the field is '1', the UE may determine a value of p0 from a value in the configured higher layer parameter p0-PUSCH-set-r16 with a p0-PUSCH-SetIf-r16 value mapped to the SRI field.

In an example, a first open-loop parameter set indication field may be '1.' Accordingly, the UE may determine the p0 from a first value in a first higher layer parameter PO-PUSCH-set-r16 with the p0-PUSCH-SetId-r16 value mapped to a first SRI field value. Similarly, a second open-loop power control parameter set indication field may be '1.' Accordingly, the UE may determine the p0 from a first value in a second higher layer parameter PO-PUSCH-set-r16 with the p0-PUSCH-SetId-r16 value mapped to a second SRI field value.

In an embodiment, in the event the UE is not provided with a configured mapping (e.g., a first mapping or a second mapping in a single configured mapping list), the UE may determine the value of the open-loop power control parameter based on the first or the second open-loop power control parameter in an open-loop power control parameter set (e.g., a default set). The default open-loop power control parameter may be associated with the single configured mapping list. Additionally or alternatively, the UE may determine default values of the power control parameter values that correspond to the first or the second set of the uplink data transmission instances.

Similarly, in the event the scheduling grant scheduling the PUSCH transmission does not include a first or a second SRI field, the UE may determine the value of the open-loop power control parameter based on the first or the second open-loop power control parameter in the open-loop power control parameter set.

The default values may include at least one of: (1) a target received power identified from an open-loop power control parameter (e.g., identified in a first open-loop power control parameter or a second open-loop control parameter) in an open-loop power control parameter set, (2) a ratio of fractional path-loss compensation identified from an open-loop power control parameter (e.g., identified in a first open-loop power control parameter or a second open-loop control parameter) in the open-loop power control parameter set, (3) a PUSCH path loss estimation RS index $q_d$ mapped to a mapping list with an identity of 0 in the event a first mapping and/or scheduling grant are absent or 1 in the event a second mapping and/or scheduling grant are absent, and (4) a closed loop power control adjustment index l with a value of 0 in the event a first mapping and/or scheduling grant are absent or 1 in the event a second mapping and/or scheduling grant are absent.

In an alternate embodiment, in the event the UE is provided a second mapping list but is not provided a second SRI field of a configured mapping contained in the second mapping list, the UE may determine the power control parameters values that correspond to a second set of uplink data transmission instances using default values. The default values may be associated with the configured mapping in the second mapping list.

The default values may include at least one of: (1) a target received power identified from an open-loop power control parameter in an open-loop power control parameter set of the configured mapping in the second mapping list, (2) a ratio of fractional path loss compensation identified from the open-loop power control parameter in the open-loop power control parameter set of the configured mapping in the second mapping list, (3) a PUSCH path loss estimation RS index $q_d$ determined from the configured mapping in the second mapping list and (4) a closed loop power control adjustment index l determined from the configured mapping in the second mapping list.

In an example, a UE may be provided with various identities of open-loop power control parameters configured by a configured mapping (e.g., a first mapping and a second mapping in a single configured mapping list). The UE may receive a scheduling grant scheduling a first PUSCH transmission using a first SRI field and a second PUSCH transmission that does not have an associated second SRI field. The UE may determine the value of the open-loop power control parameter based on the first mapping in the single configured mapping list.

In a different example, a UE may be provided with a single configured mapping list containing a first mapping and a second mapping. In the event the UE is not provided with the first mapping in the single configured mapping list, or if a scheduling grant scheduling the PUSCH transmission does not include a first SRI field, the UE may determine that the value of the open-loop power control parameter may be based on the second mapping in the single configured mapping list.

In the event one or more higher layer parameters p0-PUSCH-set-r16 (e.g., a first higher layer parameter p0-PUSCH-set-r16 and a second higher layer parameter p0-PUSCH-set-r16) is provided to the UE and the scheduling grant includes an associated open-loop power control parameter set indication field (e.g., a first open-loop power control parameter set indication field associated with a first mapping, a second open-loop power control parameter set indication field associated with a second mapping, or an open-loop power control parameter set indication field associated with a configured mapping in a single configured mapping list), the UE may determine a value of p0 from various candidate values of p0.

For instance, p0 may be determined from a first open-loop power control parameter in the open-loop power control parameter set (e.g., the set associated with the first and/or second mapping) in the event the value of the open-loop power control parameter set (e.g., the first open-loop power control parameter set and/or the second open-loop power control parameter set) indication field is '0' or '00'.

Additionally or alternatively, p0 may be determined from a first value in p0-PUSCH-set-r16 (e.g., a first and/or second p0-PUSCH-set-r16) with the lowest p0-PUSCH-SetID-r16 value in the event the open-loop power control parameter set (e.g., the open-loop power control parameter set associated with the first mapping, the second mapping, or the configured mapping in the single configured mapping list) indication field is '1' or '01'.

Additionally or alternatively, p0 may be determined from a second value in p0-PUSCH-set-r16 (e.g., a first p0-PUSCH-set-r16 and/or a second p0-PUSCH-set-r16) with the lowest p0-PUSCH-SetID-r16 value in the event the value of the open-loop power control parameter set (e.g., the open-loop power control parameter set associated with the configured mapping in the single configured mapping list, and/or the first mapping, and/or the second mapping) indication field is '10'.

In an alternate embodiment, when: (1) the UE is provided with various identities of the $q_d$ by a configured mapping (e.g., there are various identities of the $q_d$ in a single configured mapping list containing a first mapping and/or a second mapping, a configured mapping from a first mapping list and/or a configured mapping from a second mapping list) and (2) a scheduling grant scheduling the PUSCH transmission includes one or more SRI fields (e.g., a first or a second SRI field), then the UE may determine the value of the PUSCH path loss estimation RS index $q_d$ based on the configured mapping and the SRI field value. For instance, in the event of the single configured mapping, the UE may determine the value of $q_d$ based on the first mapping set and the associated first SRI field value.

For instance, a first value of the $q_d$ may be based on the configured mapping from a first mapping list and the SRI field value in the first SRI field. A second value of the $q_d$ may be based on the configured mapping from a second mapping list and the SRI field value in the second SRI field. Additionally or alternatively, a first value of the $q_d$ may be based on a first configured mapping and a second configured mapping within a single configured mapping list.

In another embodiment, in the event the UE is not provided with a configured mapping (e.g., a single configured mapping list containing a first mapping and a second mapping, and/or a configured mapping from a first mapping list and/or a configured mapping from a second mapping list are absent), the UE may determine the value of the $q_d$ based on the identity of the PUSCH path loss estimation RS index mapped to the configured mapping with identity=0. Similarly, in the event the scheduling grant scheduling the PUSCH transmission does not include a SRI field, the UE may determine the value of the $q_d$ based on the identity of the PUSCH path loss estimation RS index mapped to the configured mapping with identity=0.

In an example, in the event the UE is provided with a second mapping list, and in the event the scheduling grant schedules the PUSCH transmission does not include a second SRI field, the UE may determine the value of the $q_d$ based on the identity of the PUSCH path loss estimation RS index (which may be based on the configured mapping in the second mapping list).

In a different example, a UE may be provided with a single configured mapping list containing a first mapping and a second mapping. In the event the UE is not provided with a second mapping in the single configured mapping list, or if a scheduling grant schedules the PUSCH transmission does not include a second SRI field, the UE may determine that the value of $q_d$ based on the identity of the PUSCH path loss estimation RS index which mapped to the configured mapping with identity=1.

In an alternate embodiment, when: (1) the UE is provided with more than one value of the l by a configured mapping (e.g., there are various identities of the l configured by a single configured mapping list containing a first mapping and a second mapping, a configured mapping from a first mapping list and/or a configured mapping from a second mapping list) and (2) a scheduling grant scheduling the PUSCH transmission includes a SRI field (e.g., the PUSCH transmission is scheduled according to a first SRI field and/or a second SRI field), then the UE may determine the value of l based on the configured mapping and the SRI field value. For instance, in the event of the single configured mapping, the UE may determine the value of l based on the first mapping set and the associated first SRI field value.

In the event the UE is not provided with a configured mapping (e.g., a configured mapping is absent from the first or second mapping lists), the UE may determine the value of the close loop power control adjustment l is 0. Similarly, in the event the scheduling grant scheduling the PUSCH transmission does not include a SRI field, the UE may determine the value of the close loop power control adjustment l is 0.

In the event the UE is provided with a second mapping list, and in the event the scheduling grant scheduling the PUSCH transmission does not include a second SRI field, the UE may determine the value of the close loop power control adjustment/based on a configured mapping in the second mapping list.

In the event the UE is provided with a single configured mapping list containing a first mapping and a second mapping, and in the event the second mapping is not configured in the single configured mapping list, the UE may determine the value of the close loop power control adjustment l is 1. Similarly, in the event the UE is provided with a single configured mapping list containing a first mapping and a second mapping, and in the event the scheduling grant scheduling the PUSCH transmission does not include a second SRI field (e.g., associated with the second mapping in the single configured mapping list), then the UE may determine the value of the close loop power control adjustment l is 1.

Figure 5:
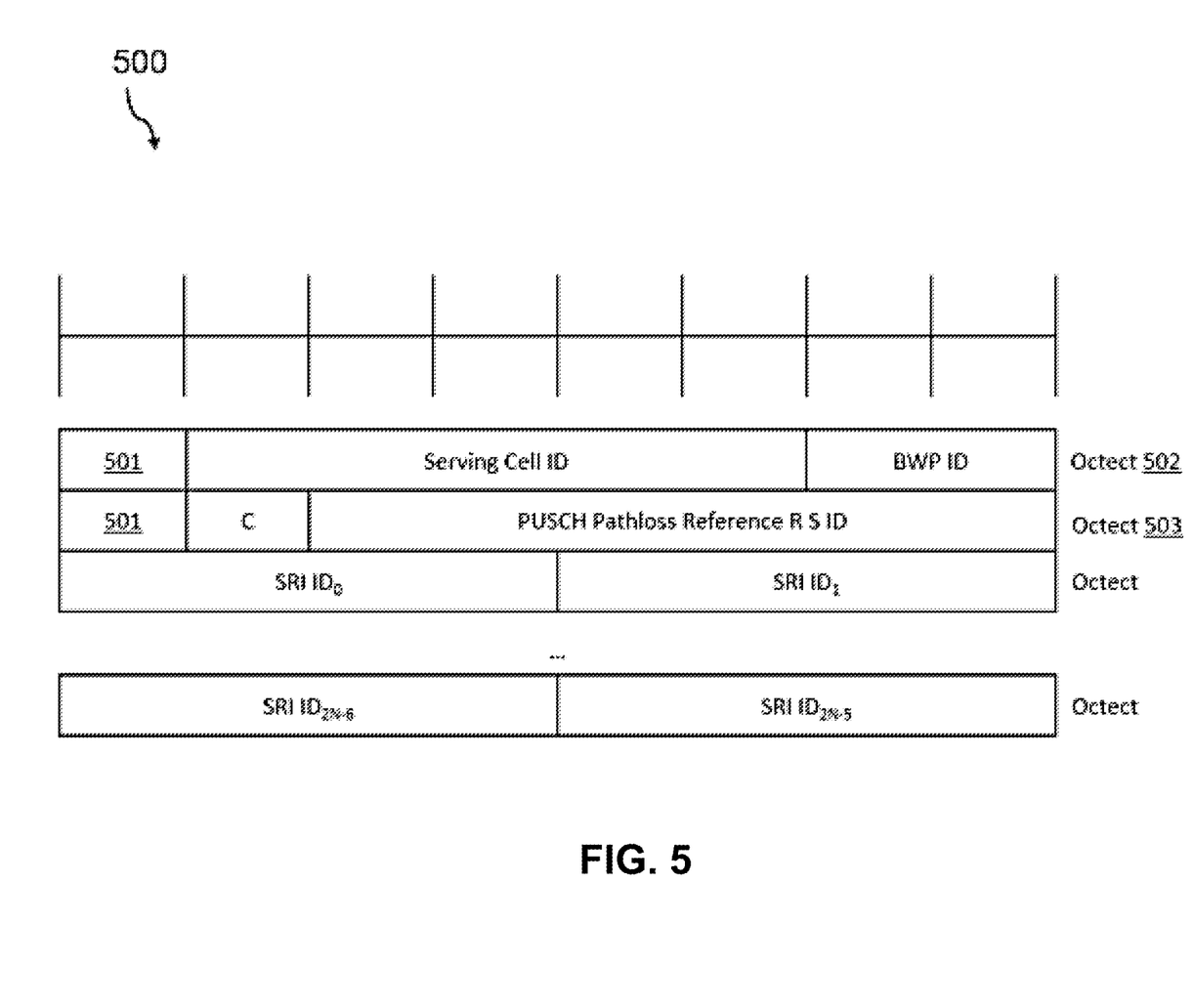
FIG. 5 illustrates an example of PUSCH path loss RS updated by a MAC CE, in accordance with some implementations of the present disclosure.

In the event the UE is also provided with the configured higher layer parameter enablePLRS-UpdateForPUSCH-SRS-r16, then the identity of $q_d$ in the configured mapping may be updated by a MAC control element (CE). FIG. 5 illustrates an example 500 of PUSCH path loss reference RS updated by a MAC CE, in accordance with some implementations of the present disclosure.

As shown, one bit out of the two reserved bits 501 may be used to indicate while mapping values may be updated by the MAC CE. For instance, one bit of the MAC CE may be configured for updating a mapping between an identity of a first mapping and an identity of a $q_d$ index in a first one of the sets of the power control parameters. Additionally or alternatively, one bit of the MAC CE may be configured for updating a mapping between an identity of a second mapping and an identity of a $q_d$ index in a second one of the sets of the power control parameters.

In an example, when one bit in octet 502 is 0, the values of the mapping between the identity of the configured mapping and the identity of the PUSCH path loss estimation RS index may be updated by the MAC CE. Both of the configured mapping and the PUSCH path loss estimation RS index may be associated to a first SRS resource set.

When the one bit in octet 502 is 1, the values of the mapping between the identity of the configured mapping and the identity of the PUSCH path loss estimation RS index may be updated by the MAC CE. Both the configured mapping and the PUSCH path loss estimation RS index are associated to a second SRS resource set.

In a different example, when the one bit in octet 503 is 0, the values of the mapping between the identity of the configured mapping and the identity of the PUSCH oath loss estimation RS index may be updated by the MAC CE. Both the configured mapping and the PUSCH path loss estimation RS index are associated to a first SRS resource set.

When the one bit in octet 503 is 1, the values of the mapping between the identity of the configured mapping and the identity of the PUSCH path loss estimation RS index are updated by the MAC CE. Both the configured mapping and the PUSCH path loss estimation RS index may be associated to a second SRS resource set.

Figure 6:
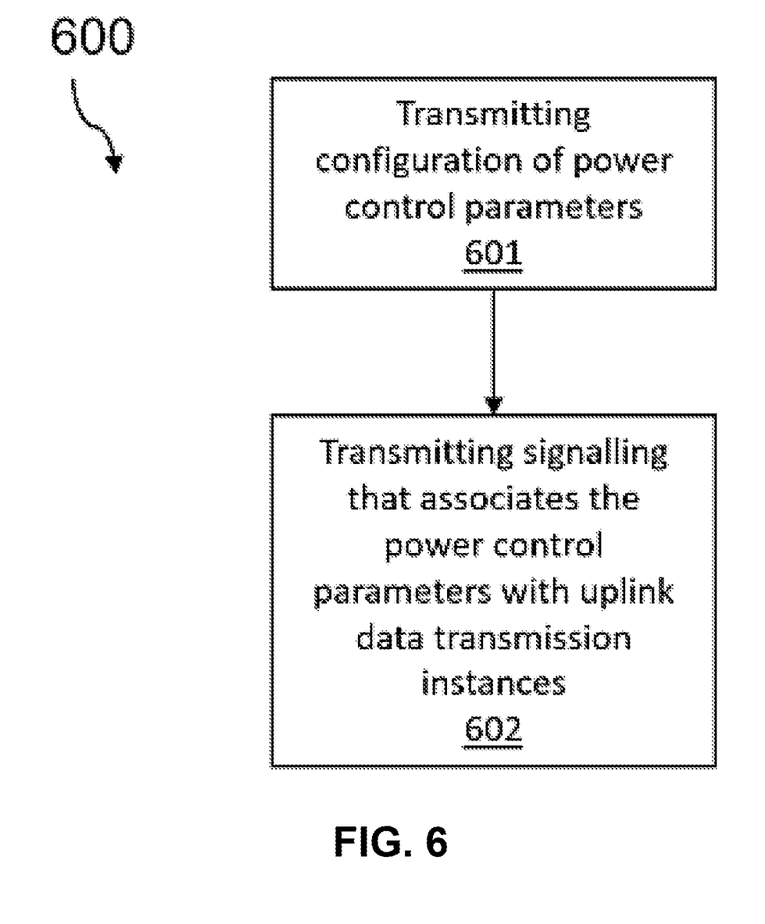
FIG. 6 illustrates an example method of BS configuring a UE for single DCI based multi-TRP PUSCH repetition, in accordance with some implementations of the present disclosure.

FIG. 6 illustrates an example method 600 of BS configuring a UE for single DCI based multi-TRP PUSCH repetition, in accordance with some implementations of the present disclosure.

As shown in 601, a BS may transmit a configuration of sets of power control parameters to a UE. The power control parameters may be the power control parameters as discussed herein. As shown in 602, the UE may also transmit signalling to associate the sets of the configured power control parameters with sets of uplink data transmission instances. The signalling may be the same signalling as discussed herein.

While various implementations of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one implementation can be combined with one or more features of another implementation described herein. Thus, the breadth and scope of the present disclosure should not be limited by any of the above-described illustrative implementations.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according implementations of the present solution.

Additionally, memory or other storage, as well as communication components, may be employed in implementations of the present solution. It will be appreciated that, for clarity purposes, the above description has described implementations of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method, comprising:
receiving, by a wireless communication device from a wireless communication node, a configuration that comprises a plurality of sets of power control parameters;
receiving, by the wireless communication device from the wireless communication node, a medium access control control element (MAC CE),
wherein a most significant bit (MSB) in a second octet of the MAC CE being 0 indicates to update a mapping between an identity of a first configured mapping and an identity of a first physical uplink shared channel (PUSCH) path loss estimation reference signal index associated with a first sounding reference signal (SRS) resource set, and
wherein the MSB in the second octet of the MAC CE being 1 indicates to update a mapping between an identity of a second configured mapping and an identity of a second PUSCH path loss estimation reference signal index associated with a second SRS resource set;
receiving, by the wireless communication device from the wireless communication node, a scheduling grant where a first SRS resource indicator (SRI) field or a second SRI field is absent; and determining, by the wireless communication device, default power control parameter values that correspond to at least a set of a plurality of sets of uplink data transmission instances, wherein each of the uplink data transmission instances includes a codebook based or non-codebook based PUSCH transmission, and wherein each of the uplink data transmission instances is associated with a corresponding SRS resource set.

2. The wireless communication method of claim 1, wherein each of the sets of power control parameters comprises at least one of: a target received power, a ratio of fractional path-loss compensation, a PUSCH path loss estimation reference signal index, or a closed loop power control adjustment index.

3. The wireless communication method of claim 1, wherein determining, by the wireless communication device, the default power control parameter values that correspond to the plurality of sets of uplink data transmission instances comprises:

determining, by the wireless communication device, that the default power control parameter values correspond to a first set of the sets of uplink data transmission instances, when the first SRI field is absent in the scheduling grant.

4. The wireless communication method of claim 3, wherein the default power control parameter values corresponding to the first set of the sets of uplink data transmission instances comprise at least one of:

a target received power identified from a first open-loop power control parameter in an open-loop power control parameter set;

a ratio of fractional path-loss compensation identified from the first open-loop power control parameter in the open-loop power control parameter set; or a closed loop power control adjustment index with a value=0.

5. The wireless communication method of claim 1, wherein determining, by the wireless communication device, the default power control parameter values that correspond to the plurality of sets of uplink data transmission instances comprises:

determining, by the wireless communication device, that the default power control parameter values correspond to a second set of the sets of uplink data transmission instances, when a second SRI field is absent in the scheduling grant.

6. The wireless communication method of claim 5, wherein the default power control parameter values corresponding to the second set of the sets of uplink data transmission instances comprise at least one of:

a target received power identified from a second open-loop power control parameter in an open-loop power control parameter set;

a ratio of fractional path-loss compensation identified from the second open-loop power control parameter in the open-loop power control parameter set; or a closed loop power control adjustment index with a value=1.

7. The wireless communication method of claim 1, wherein the configuration is received through a Radio Resource Control (RRC) signalling.

8. The wireless communication method of claim 1, wherein the scheduling grant is received through a Downlink Control Information (DCI) format.

9. A wireless communication device, comprising:
at least one processor configured to:
receive, via a receiver from a wireless communication node, a configuration that comprises a plurality of sets of power control parameters;

receive, via the receiver from the wireless communication node, a medium access control control element (MAC CE), wherein a most significant bit (MSB) in a second octet of the MAC CE being 0 indicates to update a mapping between an identity of a first configured mapping and an identity of a first physical uplink shared channel (PUSCH) path loss estimation reference signal index associated with a first sounding reference signal (SRS) resource set, and wherein the MSB in the second octet of the MAC CE being 1 indicates to update a mapping between an identity of a second configured mapping and an identity of a second PUSCH path loss estimation reference signal index associated with a second SRS resource set;

receive, via the receiver from the wireless communication node, a scheduling grant where a first SRS resource indicator (SRI) field or a second SRI field is absent; and determine default power control parameter values that correspond to at least a set of a plurality of sets of uplink data transmission instances, wherein each of the uplink data transmission instances includes a codebook based or non-codebook based PUSCH transmission, and wherein each of the uplink data transmission instances is associated with a corresponding SRS resource set.

10. The wireless communication device of claim 9, wherein each of the sets of power control parameters comprises at least one of: a target received power, a ratio of fractional path-loss compensation, a PUSCH path loss estimation reference signal index, or a closed loop power control adjustment index.

11. The wireless communication device of claim 9, wherein to determine the default power control parameter values that correspond to the plurality of sets of uplink data transmission instances comprises:

determining that the default power control parameter values correspond to a first set of the sets of uplink data transmission instances, when the first SRI field is absent in the scheduling grant.

12. The wireless communication device of claim 11, wherein the default power control parameter values corresponding to the first set of the sets of uplink data transmission instances comprise at least one of:

a target received power identified from a first open-loop power control parameter in an open-loop power control parameter set;

a ratio of fractional path-loss compensation identified from the first open-loop power control parameter in the open-loop power control parameter set; or a closed loop power control adjustment index with a value=0.

13. The wireless communication device of claim 9, wherein to determine the default power control parameter values that correspond to the plurality of sets of uplink data transmission instances comprises:

determining that the default power control parameter values correspond to a second set of the sets of uplink data transmission instances, when a second SRI field is absent in the scheduling grant.

14. The wireless communication device of claim 13, wherein the default power control parameter values corresponding to the second set of the sets of uplink data transmission instances comprise at least one of:
- a target received power identified from a second open-loop power control parameter in an open-loop power control parameter set;
- a ratio of fractional path-loss compensation identified from the second open-loop power control parameter in the open-loop power control parameter set; or
- a closed loop power control adjustment index with a value=1.

15. The wireless communication device of claim 9, wherein
- the configuration is received through a Radio Resource Control (RRC) signalling.

16. The wireless communication device of claim 9, wherein
- the scheduling grant is received through a Downlink Control Information (DCI) format.

* * * * *